United States Patent
Gu (10) Patent No.: US 7,477,658 B2
(45) Date of Patent: Jan. 13, 2009

(54) RADIO RESOURCE CONTROL

(75) Inventor: Jian Gu, Huangqi Nanhai Guangdong (CN)

(73) Assignee: Nokia Corporation, Espoo (FI)

( * ) Notice: Subject to any disclaimer, the term of this patent is extended or adjusted under 35 U.S.C. 154(b) by 769 days.

(21) Appl. No.: 10/786,536

(22) Filed: Feb. 26, 2004

(65) Prior Publication Data

US 2005/0111476 A1    May 26, 2005

(30) Foreign Application Priority Data

Nov. 20, 2003    (FI)    ................... 20031688

(51) Int. Cl.
*H04J 3/22*    (2006.01)

(52) U.S. Cl. ..................................... 370/468

(58) Field of Classification Search ................ 370/311, 370/441, 318, 335, 332
See application file for complete search history.

(56) References Cited

U.S. PATENT DOCUMENTS

| | | | | |
|---|---|---|---|---|
| 5,603,096 A | * | 2/1997 | Gilhousen et al. | 455/69 |
| 5,812,938 A | * | 9/1998 | Gilhousen et al. | 455/69 |
| 5,839,056 A | * | 11/1998 | Hakkinen | 455/69 |
| 6,028,851 A | * | 2/2000 | Persson et al. | 370/329 |
| 6,639,934 B1 | * | 10/2003 | Engstrom et al. | 375/130 |
| 6,904,290 B1 | * | 6/2005 | Palenius | 455/522 |
| 2004/0077370 A1 | * | 4/2004 | Dick et al. | 455/522 |

* cited by examiner

*Primary Examiner*—Seema S Rao
*Assistant Examiner*—Mon Cheri S Davenport
(74) *Attorney, Agent, or Firm*—Squire, Sanders & Dempsey, LLP (57) ABSTRACT

Telecommunications system and method supporting a plurality of data rates are disclosed. The system includes an adjusting device that adjusts a target signal-to-interference ratio of a closed-loop power control to match a data rate applied in transmission of a dedicated channel. The system provides data-rate-sensitive power control thus to increase the accuracy of the power control and to improve the performance of the telecommunications system.

22 Claims, 3 Drawing Sheets

RADIO RESOURCE CONTROL

BACKGROUND OF THE INVENTION

1. Field of the Invention

The invention relates to a method of controlling radio resources in telecommunications system, an arrangement, and a radio network controller.

2. Description of the Related Art

Controlling the transmit power of radio channels plays a significant role in the performance of interference limited telecommunications systems, such as CDMA (Code Division Multiple Access) systems. As the performance requirements have increased, the power control is required to account for fast temporal changes in the radio channels.

One tool for providing a fast power control is based on closed-loop power control, wherein a receiver receives a dedicated channel and performs a SIR (Signal-to-Interference Ratio) measurement on the dedicated channel. A transmit power control command is generated based on a comparison between a target SIR and the SIR measurement, and the transmit power control command is transmitted to the transmitter in order to adjust the transmit power of the dedicated channel to provide the target SIR. The target SIR is typically generated on the basis of success or failure of decoding a coding block, such as a frame, within limits of required quality, such as that defined by a FER target.

Some telecommunications systems support rate control, which enables changing the data rate in a time scale of the order of the duration of data coding block.

Therefore it is desired to consider power control methods, which account for the rate control.

SUMMARY OF THE INVENTION

An object of the invention is to provide an improved radio resource control method and a device implementing the method. According to an aspect of the invention, there is provided a method of controlling radio resources in telecommunications system supporting use of a plurality of data transfer rates in transmission of dedicated channels between a transmitter and a receiver, in which method a target SIR is adjusted to match a first data rate applied during a first TX time interval of the dedicated channel, the target SIR providing a reference SIR value for closed-loop power control, wherein a comparison between a SIR measured from the dedicated channel transmitted at the first data rate and the target SIR is performed, and wherein a transmit power control command is provided to the transmitter on the basis of the comparison.

According to a second aspect of the invention, there is provided an arrangement for controlling radio resources in telecommunications system supporting use of a plurality of data transfer rates in transmission of a dedicated channel transmitted from a transmitter to a receiver, the arrangement including an adjusting unit connected to the receiver, for adjusting a target SIR to match a first data rate applied during a first TX time interval of the dedicated channel, the target SIR providing a reference SIR value for closed-loop power control, wherein a comparison between a SIR measured from the dedicated channel transmitted at the first data rate and the target SIR is performed, and wherein a transmit power control command is provided to the transmitter on the basis of the comparison.

According to another aspect of the invention, there is provided a radio network controller in telecommunications system supporting use of a plurality of data transfer rates in transmission of a dedicated channel from a transmitter to a receiver, the radio network controller including an adjusting unit connected to the receiver, for adjusting a target SIR to match a first data rate applied during a first TX time interval of the dedicated channel, the target SIR providing a reference SIR value for closed-loop power control, wherein a comparison between a SIR measured from the dedicated channel transmitted at the first data rate and the target SIR is performed, and wherein a transmit power control command is provided to the transmitter on the basis of the comparison.

Preferred embodiments of the invention are described in the dependent claims.

The method and system of the invention provide several advantages. The invention provides data-rate-sensitive power control of a transmitter, thus increasing the accuracy of the power control and improving the performance of the telecommunications system.

BRIEF DESCRIPTION OF THE DRAWINGS

In the following, the invention will be described in greater detail with reference to the preferred embodiments and the accompanying drawings, in which.

DETAILED DESCRIPTION OF THE PREFERRED EMBODIMENTS

Figure 1:
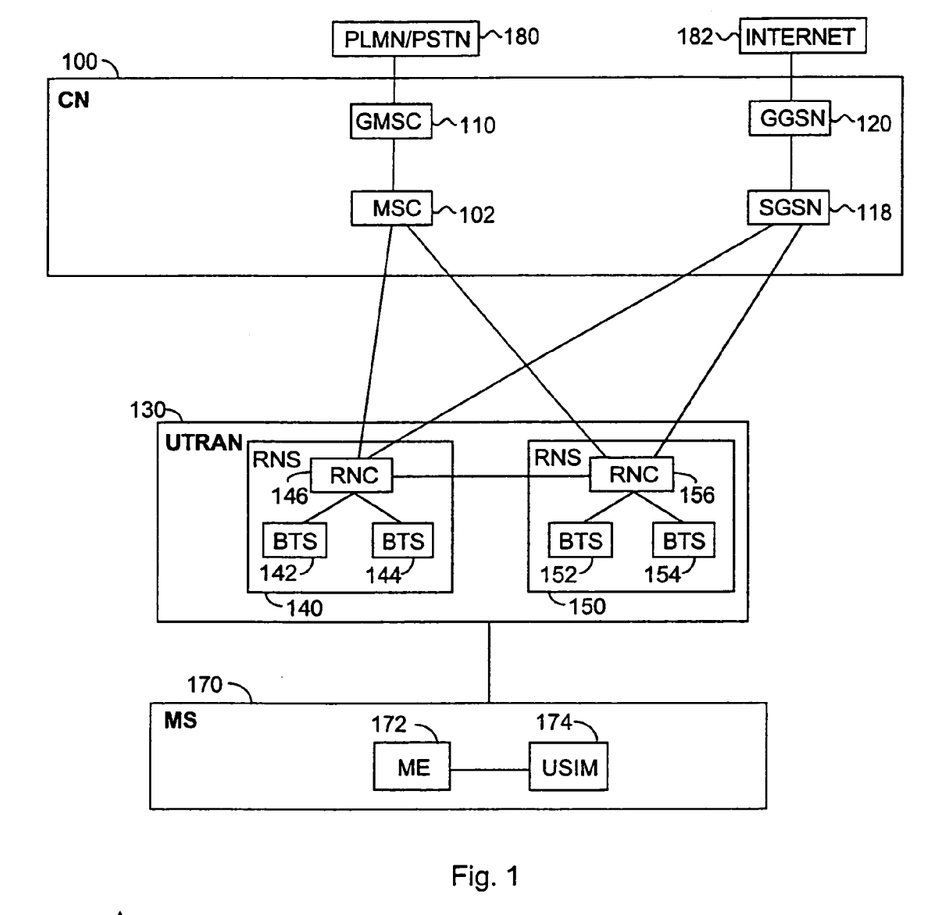
FIG. 1 shows an example of telecommunications system.

FIG. 1 shows an example of telecommunications system by means of a simplified block diagram. The structure and functions of the network elements are only described when relevant to the present solution.

The illustrated telecommunications system includes a core network (CN) 100, a radio access network 130 and a mobile station (MS) 170. For sim-simplicity, a radio access network 130 called UTRAN (UMTS (Universal Mobile Telecommunications System) Terrestrial Radio Access Network) is taken as an example. UTRAN belongs to the third generation and is implemented with WCDMA (Wideband Code Division Multiple Access) technology. The solution is not limited to a WCDMA radio interface but applications exist which are implemented with cdma2000, MC-CDMA (Multi-Carrier Code Division Multiple Access) or OFDMA (Orthogonal Frequency Division Multiple Access) technologies without restricting the invention to those technologies.

The telecommunications system may be divided into a mobile station 170 and a network part. The mobile station 170 may also be called user equipment, a terminal, a subscriber terminal and a mobile telephone. The mobile station 170 may also be a radio modem providing an air interface for a portable computer device.

The network part comprises the fixed infrastructure of the radio system, i.e. the core network 100 and the radio access network 130.

The illustrated structure of the core network 100 corresponds to a system, which incorporates both circuit-switched and packet-switched domains. Both domains may share the radio access network 130.

A mobile services switching center (MSC) 102 is the center point of the circuit-switched domain of the core network 100. The mobile services switching center 102 typically serves the connections of the radio access network 130. The tasks of the mobile services switching center 102 include: switching, paging, user equipment location registration, handover management, collection of subscriber billing information, encryption parameter management, and echo cancellation.

Large core networks 100 may have a separate gateway mobile services switching center (GMSC) 110, which is typically responsible for circuit-switched connections between the core network 100 and external networks 180, such as a public land mobile network (PLMN) and a public switched telephone network (PSTN).

A serving GPRS support node (SGSN) 118 is the center point of the packet-switched domain of the core network 100. The main task of the serving GPRS support node 118 is to transmit and receive packets together with the mobile station 170 supporting packet-switched transmission by using the radio access network 130 or the base station system. The serving GPRS support node 118 contains subscriber and location information related to the mobile station 170.

A gateway GPRS support node (GGSN) 120 is the packet-switched side counterpart of the gateway mobile services switching center 110 of the circuit-switched side with the exception, however, that the gateway GPRS support node 120 must also be capable of routing traffic from the core network 100 to external networks 182, whereas the gateway mobile services switching center 110 only routes incoming traffic. In our example, external networks 182 are represented by the Internet.

The radio access network 130 comprises radio network subsystems 140, 150. Each radio network subsystem 140, 150 comprises radio network controllers (RNC) 146, 156 and base transceiver stations (BTS) 142, 144, 152, 154. Terms such as 'base station' and 'node B' instead of 'base transceiver station' may also be used. The base station 142, 144, 152, 154 provides the mobile station 170 with access to the core network 100. Solutions may exist in which the base station 142, 144, 152, 154 is capable of implementing both the TDMA and WCDMA radio interfaces simultaneously.

The mobile station 170 provides a user with access to the telecommunication system. The mobile station 170 comprises two parts: mobile equipment (ME) 172 and a UMTS subscriber identity module (USIM) 174. The mobile station 170 comprises at least one transceiver for establishing a radio link to the radio access network 130. The mobile station 170 may comprise at least two different subscriber identity modules. The mobile station 170 further comprises an antenna, a user interface and a battery. Today, different types of mobile station 170 exist, for instance equipment installed in cars, and portable equipment.

The USIM 174 comprises user-related information and information related to information security, such as an encryption algorithm.

Figure 2:
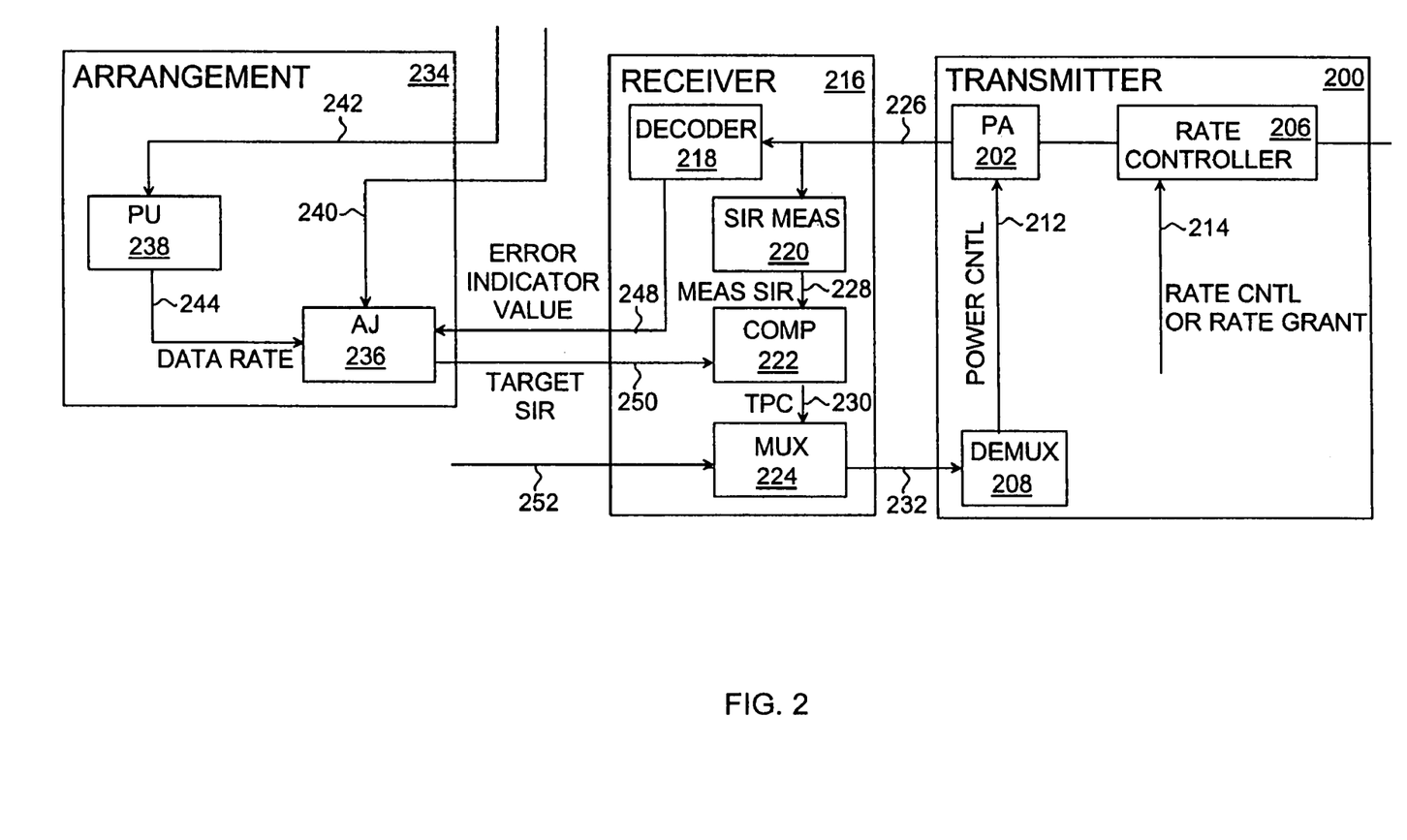
FIG. 2 shows a second example of telecommunications system.

With reference to FIG. 2, a transmitter 200 transmits a dedicated channel 226, which is received by a receiver 216. The dedicated channel 226 provides a data transfer channel and is typically dedicated to a single transmitter-receiver pair, and may be separated from other radio channels by a specific channelization coding. The dedicated channel 226 may further be associated with a specific antenna beam, which may be a transmit antenna beam or a receive antenna beam depending on the antenna configuration of the receiver 216 and the transmitter 200.

In UTRAN, the dedicated channel 226 may be an uplink dedicated physical channel, such as a DPDCH (Dedicated Physical Data Channel), and DPCCH (Dedicated Physical Control Channel), for example. In this case, the transmitter 200 is base station 142, and the receiver 216 is the mobile station 170.

In UTRAN, the dedicated channel 226 may be a downlink dedicated physical channel, such as a DPCH (Downlink Dedicated Physical Channel).

The CDMA telecommunications system to which the invention may be applied supports use of a plurality of data transfer rates, also called transmission data rates, in transmission of the dedicated channels. Data rate typically characterizes an average number of bits, characters, symbols, or blocks per unit time transmitted by the transmitter. The unit of the data rate may be, for example, bits per seconds.

The data rate may be controlled by a rate controller 206 in the transmitter according to a rate control command 214 or a rate grant command 214. The rate control command 214 or the rate grant command 214 may be generated in the base station 142 or in the mobile station 170 depending on the embodiment.

The physical signal carrying the dedicated channel 226 may be amplified in a power amplifier 202 in the transmitter 200.

The dedicated channel 226 is received by the receiver 216, which may measure a SIR (Signal-to-interference Ratio) in a SIR measurement unit 220. A SIR measurement procedure and the structure of the SIR measurement unit 220 are known to one skilled in the art.

The SIR characterizes a signal quality of the dedicated channel obtained with a direct measurement. Thus, in an interpretation, the SIR may be one of the following: SIR (a ratio of the signal power to the interference power), $E_b/N_0$ (a ratio of the combined received energy per information bit to the noise power spectral density), $E_b/N_t$ (a ratio of the combined received energy per information bit to the effective noise power spectral density), $E_c/I_0$ (a ratio of the pilot energy accumulated over one PN chip period to the total power spectral density in the received bandwidth), and C/I (a ratio of the carrier power to the interference power). The invention is not, however, restricted to the aforementioned measures.

A measured SIR 228 is inputted from the SIR measurement unit 220 into a comparator unit 222, which compares the measured SIR with a target SIR 250 received from an adjusting unit 236. The target SIR 250 provides a reference SIR value for a closed loop power control.

The comparator 222 generates a transmit power control command 230 (TPC) on the basis of the comparison, and inputs the TPC 230 into a multiplexer 224. For example, if the measured SIR 228 is smaller than the target SIR 250, the TPC 230 aims at increasing the transmit power of the dedicated channel 226. If the measured SIR is larger than the target SIR 250, the TPC 230 aims at decreasing the transmit power of the dedicated channel 226.

The multiplexer 224 multiplexes the TPC 230 into a physical channel 232, such as the DPCH or DPCCH, and provides the TPC 230 to the receiver 200. The physical channel 232 may further transfer a payload signal 252 inputted into the multiplexer 224. The receiver 200 may include a demultiplexer 208, which extracts the TPC 230 from the physical channel 232, and provides the power amplifier 202 with the TPC 212.

The power amplifier 202, the SIR measurement unit 220, the comparator 222, the multiplexer 220, and the demultiplexer 208 provide an example of an implementation of an inner loop of closed-loop power control. The invention is not, however, restricted to the presented example but may be applied to any power control mechanism, which supports fast power control, wherein a target SIR 250 is used as a reference value for the inner loop. In UTRAN, for example, the duration of a cycle of the inner loop may be 667 microseconds at minimum, and the inner loop power control works together with the open loop power control.

Coding blocks, such as frames, of the dedicated channel 226 may be decoded in the decoder 218. The decoder 218 may report an error indicator 248 to the adjustment unit 236. The error indicator 248 typically characterizes the quality of the data transfer carried by the dedicated channel 226. The error indicator 248 may be a result of a CRC (Cyclic Redundancy Check), estimated BER, soft information, or $E_b/N_0$, for example. The error indicator 248 typically indicates success of decoding i.e. an erroneous or correct decoding of a coding block decoded in the decoder 218.

Figure 3:
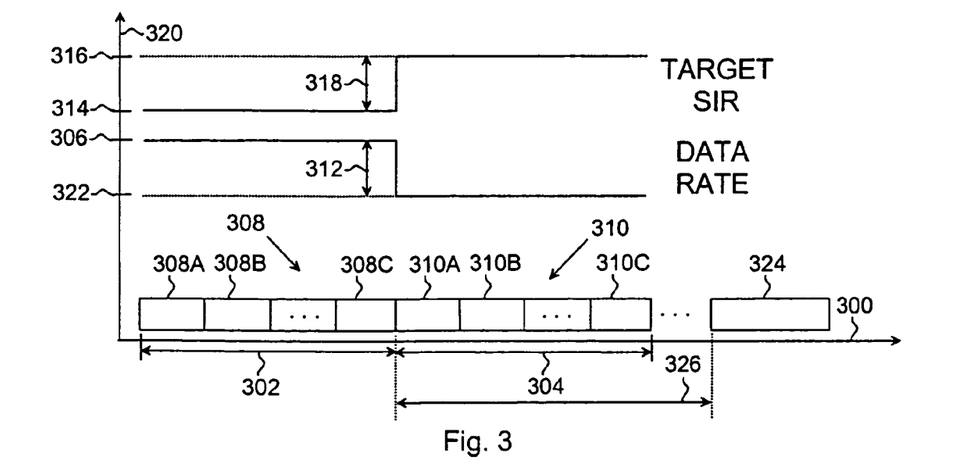
FIG. 3 shows time evolution of parameters associated with data transfer.

With reference to FIG. 3 let us consider an example of time evolution of parameters associated with the data transfer. The x-axis 300 shows time in arbitrary scale, such that the occasions on the right hand side take place earlier than those on the left hand side. The y-axis 320 shows the data rate and target SIR 250 in arbitrary scales.

The transmission of the dedicated channel 226 may be divided into a first TX (transmission) time interval 302 and a second TX time interval 304. Further time intervals transmitted at different data rates may occur before the second TX time interval 304 and after the first TX time interval 302, but they are not shown in FIG. 3. The first TX time interval 302 and the second TX time interval 304 may locate temporally in any time instant in the transmission of the dedicated channel 226.

During the first TX time interval 302, the dedicated channel 226 is transmitted at a first data rate 306. A first coding block 308 is transmitted during the first TX time interval 302. The first data rate 306 may be any data rate supported by the telecommunications system. The target SIR may be adjusted to the value 314 during the first TX time interval 302.

During the second TX time interval 304, the dedicated channel 226 is transmitted at a second data rate 322. A second coding block 310 is transmitted during the second TX time interval 304. The second TX time interval 304 is transmitted prior to the first TX time interval 302. The second data rate 322 may be any data rate supported by the telecommunications system. The target SIR 250 is adjusted to value 316.

FIG. 3 further shows a third coding block 324 transmitted prior to the first coding block 308. The third coding block 324 may have similar structure and characteristics to those of the first coding block 308 and the second coding block 310. The third coding block 324 may be transmitted at any data rate.

There may be other TX time intervals between the second TX time interval 304 and the first TX time interval 302. The other TX time intervals may be transmitted at the second data rate 322. In this context, the third coding block 324 represents any coding block, which is decoded before the reception of the first TX time interval 302, and is thus capable of providing information for adjusting the target SIR for the reception of the first TX time interval 302.

A coding block 308, 310, 324 may be a frame structure, such as a radio TTI (Transmission Time interval). In UTRAN, for example, the duration of a TX time interval 302, 304 is typically a multiple of the duration of a 20-milliseconds TTI.

The first coding block 308 and the second coding block 310 may be divided into time slots 308A, 308B, 308C and 310A, 310B, 310C, respectively. In UTRAN, a coding block 308, 310 includes 30 time slots, each time slot corresponding to an inner loop power control period.

FIG. 3 illustrates a case wherein the data rate applied in the transmission of the dedicated channel 226 is changed from the second data rate 322 to the first data rate 306. The time instant of the change in the target SIR from value 316 to value 314 may be different from the time instant of the change of the data rate from the second data rate 322 to the first data rate 306.

The adjusting unit 236 adjusts the target SIR 250 to match the first data rate 306, and inputs the target SIR 314 into the comparator 222. Now, the target SIR 250 matches the transmission data rate, and the inner loop of the closed-loop power control converges to a required transmit power, thus enabling minimizing the multi-user interference effects and increasing the capacity of the telecommunications system.

The adjusting unit 236 may be implemented with a computer and software, and required interfaces and connections to the receiver 216. The computer may include random access memory.

In an embodiment of the invention, the adjusting unit 236 adjusts the target SIR 250 to provide the required quality of the dedicated channel 226. The required quality may be indicated by a target FER (Frame Error Rate) or another quality measure characterizing the required quality of the data transfer. The adjusting unit 236 may, for example, include a look-up table including target SIR 250 values for various data rates for different required qualities of the dedicated channel 226. For example, there are target FER values $FER_t=5\%$ and $FER_t=1\%$ corresponding to the required quality of transmission of a video signal and transmission of an electric mail file, respectively. For such a purpose, there may be a look-up table for each of target FER value, and as a result, a different target SIR 250 is obtained in the two cases, thus leading to different transmit power requirements in the transmitter 200.

In an embodiment of the invention, the adjusting unit 236 estimates a change 318 in a required SIR with respect to a change from a second data rate 322 to the first data rate 306. The required SIR is defined, for example, by the target FER. The target SIR 314, which matches the first data rate 306, may be obtained by subtracting the change 318 in the required SIR from the target SIR 316, which matches the second data rate 322.

It is noted that additional factors, such as those depending on decoding results indicated by the error indicator value 248, may be accounted for when estimating the change in the target SIR. It is further noted that there may be other coding blocks between the first coding block 308 and the second coding block 310.

The error indicator value 248 may characterize the reliability of the decoding of a third coding block 324 transmitted prior to the first TX time interval 302. In an embodiment, the third coding block 324 is transmitted k coding blocks prior to the first coding block 308, wherein k coding blocks characterizes a decoding delay 326 and k=1, 2, . . . .

The changes 318 in the required SIR corresponding to different target FERs may be stored in the memory of the adjusting unit 236 and retrieved from the memory according to the change in the data rate 312. In terms of mathematical expressions, the target SIR corresponding to the first data rate may be expressed as $$SIR_t(r_1)=SIR_t(r_2)+\Delta_{FIXED}+\Delta_{RATE\_SENSITIVE}(r_1, r_2), \quad (1)$$

wherein $SIR_t(r_1)$ and $SIR_t(r_2)$ are the target SIR values matching the first data rate $r_1$ and the second data rate $r_2$, respectively. Parameter $\Delta_{RATE\_SENSITIVE}(r_1, r_2)$ characterizes the change in the required SIR when the data rate is changed from the second data rate $r_2$ to the first data rate $r_1$. For example $\Delta_{RATE\_SENSITIVE}(r_1, r_2)$ may be written as $$\Delta_{RATE\_SENSITIVE}(r_1, r_2) = \left(\frac{Eb}{No}\right)_{r_1} - \left(\frac{Eb}{No}\right)_{r_2} \quad (2)$$

wherein $E_b$ is the receiver energy per bit, and No is the power density in the received frequency band. Quantities $$\left(\frac{Eb}{No}\right)_{r_1}$$

and $$\left(\frac{E_b}{N_0}\right)_{r_2}$$

are the target values of the $$\left(\frac{E_b}{N_0}\right)$$

corresponding to a required quality, such as that indicated by the target FER, of the dedicated channel 226 for the first data rate $r_1$ and the second data rate $r_2$, respectively. The target values $$\left(\frac{E_b}{N_0}\right)_{r_1}$$

and $$\left(\frac{E_b}{N_0}\right)_{r_2}$$

may be obtained by a link level simulation, for example, and stored in the memory of the adjusting unit 236. Eq. (1) may be applied, for example, when the first TX time interval 302 and the second TX time interval 304 are consecutive TX time intervals.

The target values of $$\left(\frac{E_b}{N_0}\right)_{r_1}$$

and $$\left(\frac{E_b}{N_0}\right)_{r_2}$$

may be located in a look-up table of the adjusting unit 236 and retrieved from the look-up table by inputting the appropriate data rate or an index of the data rate into the look-up table.

Parameter $\Delta_{FIXED}$ characterizes the change in the data rate due to the conventional target SIR adjustment, and can be expressed as $$\Delta_{FIXED} = -\frac{\Delta_{UP}}{1/FER_t - 1}, \quad (3)$$

when the error indicator value 248 indicates a successful decoding of the third coding block 324 transmitted prior to the first TX time interval 302, and $$\Delta_{FIXED} = \Delta_{UP}, \quad (4)$$

when the error indicator value 248 indicates an unsuccessful decoding of the third 324 coding block transmitted prior to the first TX time interval 302.

In an embodiment of the invention, the adjusting unit 236 indicates if the target SIR $SIR_t(r_1)$, such as that shown in Equation (1), falls outside a range of the allowed SIR values. The allowed SIR values may be specific to the required quality of the dedicated channel 226 and the range may be defined by a lower limit $SIR_{min}$ and an upper limit $SIR_{max}$. If the target SIR falls outside the range $[SIR_{min}, SIR_{max}]$, the adjusting unit 236 sets the target SIR into a value, which falls within the range. For example, if the target SIR $SIR_t(r_1)$ is greater than $SIR_{max}$, the target SIR may be fixed at the $SIR_{max}$ value i.e. $SIR_t(r_1)=SIR_{max}$ until a new target SIR falls within the range. If the target SIR $SIR_t(r_1)$ is less than the $SIR_{min}$ the target SIR may be fixed at the $SIR_{min}$ value i.e. $SIR_t(r_1)=SIR_{min}$, until a new target SIR falls within the range.

A test whether the target SIR falls outside the range of the allowed SIR values and the setting procedure wherein the target SIR is set to an allowed SIR value may be implemented with a computer and software in the adjusting unit 236.

A case may occur, where the receiver 216 requires information on the data rates applied in the transmission. The first data rate value may be indicated with signalling information provided to the adjusting unit 236 prior to changing the data rate from one to another. The adjusting unit 236 may include a register, where possible data rates and the associated adjusting parameters, such as the target values of $$\left(\frac{E_b}{N_0}\right)_{r_1}$$

and $$\left(\frac{E_b}{N_0}\right)_{r_2}$$

are stored.

In an embodiment of the invention, the adjusting unit 236 includes a look-up table, which provides the adjusting parameters for a given data rate and given target FER.

In an embodiment of the invention, the adjusting unit 236 receives data rate information 240 on the first data rate 306. The data rate information 240 may include, for example, an exact value of the first data rate 306.

In an embodiment of the invention, the arrangement 234 further includes a predicting unit 238 connected to the adjusting unit 236. The predicting unit 238 predicts the first data rate from received signalling information 242. The predicted first data rate 244 is inputted from the predicting unit 238 into the adjusting unit 236. The prediction may be used, for example, when the first data rate to be used in the transmission is not available before the reception of the first coding block 308. The predicting unit 238 may be implemented with a computer and appropriate software.

A similar predicting procedure may be applied to predict any data rate used in constructing the target SIR.

For example, when the transmitter 200 transmitting the dedicated channel 226 is a base station 142, a scheduler located in the base station 142 or in the radio network controller 146 determines the first data rate to be used in the transmission, and notifies the mobile station 170 about the first data rate with signalling information 242. In such a case, the predicting unit 238 located in the mobile station 170 generates the first data rate value on the basis of the signalling information.

When the transmitter 200 transmitting the dedicated channel 226 is a mobile station 170 a scheduler located in the base station 142 or in the radio network controller 146 determines an appropriate data rate to be used in the transmission and transmits to the mobile station 170 rate control commands 214 or rate grant commands 214 according to which the rate controller 206 of the mobile station 170 determines the actual data rate i.e. the first data rate. The first data rate may be selected on the basis of the data rate suggested by the base station 142, and status information, such as buffer information and power information, of the mobile station 170. The mobile station 170 may transmit the information on the first data rate to the base station 142, and further to the adjusting unit 236, in advance. In some cases, however, the information on the first data rate is transmitted simultaneously with the dedicated channel 226, and the first data rate is predicted in the adjusting unit 236 based on the rate control commands 214 or rate grant commands 214 transmitted to the mobile station 170.

The prediction of the data rates may indicate that the parameters, such as the target values of $$\left(\frac{E_b}{No}\right)_{r_1}$$

and $$\left(\frac{E_b}{No}\right)_{r_2}$$

for the predicted first data rate $r_1$ and the predicted second data rate $r_2$, respectively, used in constructing the target SIR, may be unknown a priori to the adjusting unit 236. In an embodiment, the adjusting unit 236 estimates a required value of the target $$\left(\frac{E_b}{No}\right)_{r_1}$$

by using the target values of $$\left(\frac{E_b}{No}\right)$$

for data rates known to the adjusting unit 236. The estimation may be performed with interpolating or extrapolating methods, for example. The estimation may be implemented with a computer and software, for example. It may also be possible, that the estimated target $$\left(\frac{E_b}{No}\right)$$

is then stored in the memory of the adjusting unit 236 for a later use.

It is noted, that although the prediction of the data rate is described in conjunction with the first data rate, similar procedures and functional elements, such as the predicting unit 238, may be applied to any TX time interval occurring in the bit stream transmitted between the transmitter 200 and the receiver 216.

In mathematical terms, the target SIR may be expressed as follows:

$$SIR_t(r_1) = SIR_t(r_2) + \Delta_{FIXED} - f\left\{\left(\frac{E_b}{No}\right)_{r_2}, \left(\frac{E_b}{No}\right)_{r_{2P}}\right\} + \left(\frac{E_b}{No}\right)_{r_{1P}}, \quad (5)$$

where data rates $r_{2p}$ and $r_{1p}$ are predicted data rates of the second data rate $r_2$ and the first data rate $r_2$, respectively. The value of the $\Delta_{FIXED}$ depends on whether the second coding block 310 was decoded correctly or erroneously. Function f characterizes contribution of the data rate change to the change in the target SIR and may be expressed in more explicit form as $$f\left\{\left(\frac{E_b}{No}\right)_{r_2}, \left(\frac{E_b}{No}\right)_{r_{2p}}\right\} = \omega\left(\frac{E_b}{No}\right)_{r_2} + (1-\omega)\left(\frac{E_b}{No}\right)_{r_{2P}}, \quad (6)$$

where parameter ω accounts for an error in the data rate prediction of the second data rate $r_2$ and may have values between 0 and 1. If the second coding block 310 was decoded erroneously, parameter ω takes value $\omega_1$. If the second coding block 310 was decoded correctly, parameter ω takes value $\omega_2$. Furthermore, if the predicted value of the second data rate $r_2$ is a known parameter, ω may be set to ω0.

In general terms, the $SIR_t(r_2)$ and the function arguments in function f may be results from the previous target SIR adjusting step, whose adjusting parameters, such as the $$\left(\frac{E_b}{No}\right)$$

value, are available to the adjusting unit 236. With this procedure, the SIR adjusting procedure follows smoothly the changes in the radio environment and the requirements of the radio link.

Embodiments of the invention may also be considered in terms of non-consecutive frames transmitted in the dedicated channel 226. A target SIR for a $n_2$:th frame may be expressed as $$SIR_t(n_2) = SIR_t(n_1) + \sum_{n=n_1+1-k}^{n_2-k} g(e_n) - f\left\{\left(\frac{E_b}{No}\right)_{r_{n_1}}, \left(\frac{E_b}{No}\right)_{r_{n_1}P}\right\} + \left(\frac{E_b}{No}\right)_{r_{n_2}P} \quad (7)$$

wherein $SIR_t(n_2)$ and $SIR_t(n_1)$, respectively, denote the SIR targets of the dedicated channel 226 for the $n_1$th and $n_2$th frames. Factor $e_n$ is the error indicator value 248 of the nth coding block. Factor $g(e_n)$ the function of SIR target difference dependent on the success or failure of decoding the nth frame transmitted between the $(n_1+1-k)$th and $(n_2-k)$th frames. Factor k represents the coding delay in coding block units.

The equations (1) to (7) and the quantities therein are typically expressed in dB units. However, it is clear to one skilled in the art how to convert the equations into other units.

In an embodiment of the invention, the receiver is located in a mobile station 170 and the transmitter 200 is located in a base station 142. In this case, the adjusting unit 236, and the predicting unit 238 are located in the mobile station 170.

In an embodiment of the invention, the receiver 216 is located in a base station 142 and the transmitter 200 is located in a mobile station 170. In this case, the adjusting unit 236, and the predicting unit 238 may be located in the base station 142 or in the radio network controller 146. Applications may exist, wherein the adjusting unit 236, and the predicting unit 238 are distributed both to the base station 142 and the radio network controller 146.

Figure 4:
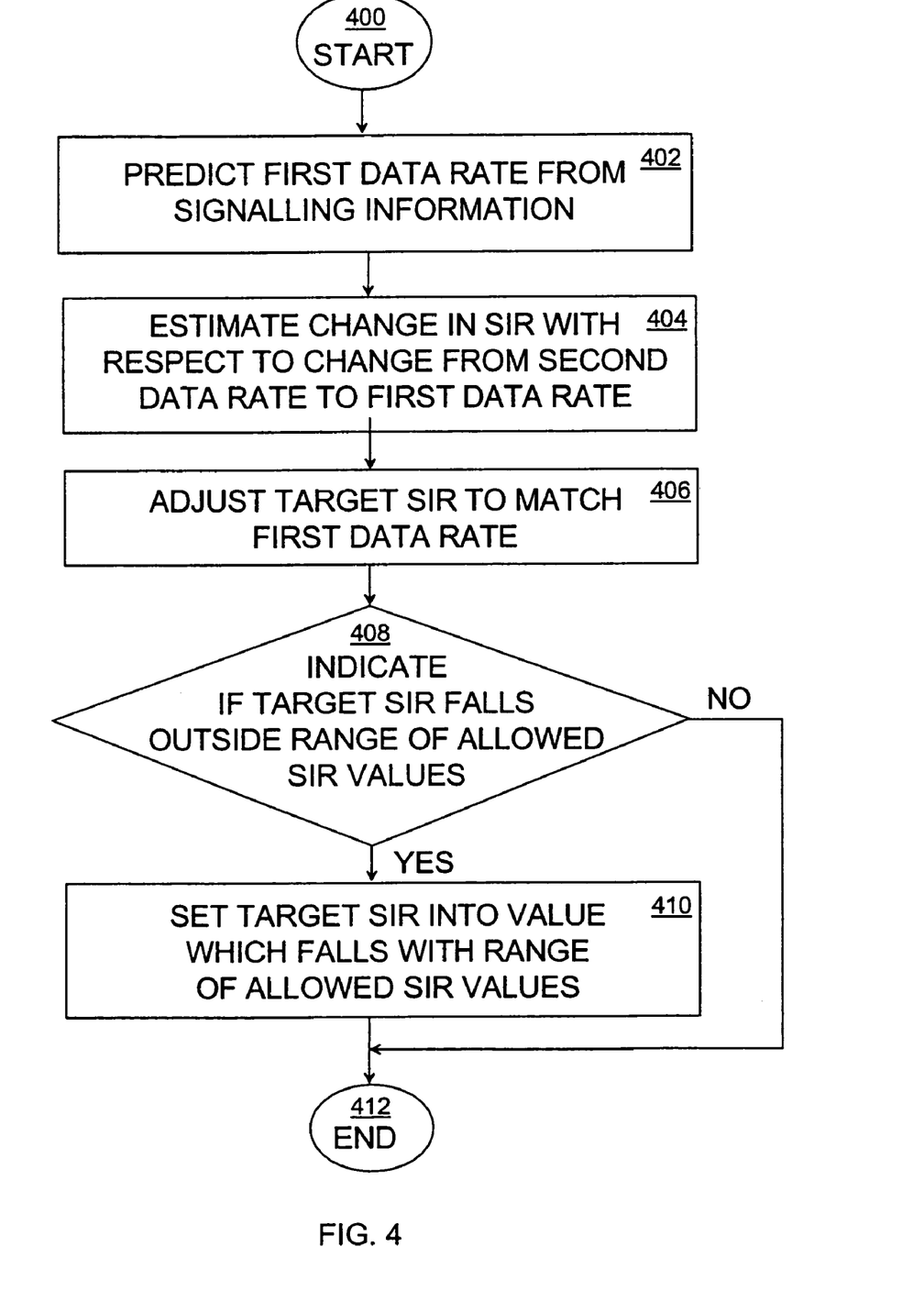
FIG. 4 shows methodology according to embodiments of the invention.

With reference to FIG. 4, the methodology according to embodiments of the invention is illustrated.

In 400, the method starts.

In 402, the first data rate is predicted from received signalling information.

In 404, a change in a required SIR is estimated with respect to a change from a second data rate to the first data rate, the second data rate being applied to the dedicated channel 226 during a second TX time interval transmitted prior to the first TX time interval.

In 406, the target SIR is adjusted to match a first data rate applied during a first TX time interval of the dedicated channel 226.

In 408, it is indicated if the target SIR falls outside a range of the allowed SIR values.

In 410, if the target SIR falls outside the range of the allowed target SIR values, the target SIR is set into a value which falls within the allowed range.

In 412, the method ends.

Even though the invention is described above with reference to an example according to the accompanying drawings, it is clear that the invention is not restricted thereto but it can be modified in several ways within the scope of the appended claims.

The invention claimed is:

1. A method, comprising:
estimating a change in a required signal-to-interference with respect to a change from a first data rate to a second data rate, wherein the first data rate is applied to a dedicated channel during a first transmission time interval transmitted prior to a second transmission time interval;
adjusting a target signal-to-interference to match the second data rate applied during the second transmission time interval of the dedicated channel, wherein the target signal-to-interference is configured to provide a reference signal-to-interference value for closed-loop power control;
adjusting the target signal-to-interference by using the change in the required signal-to-interference and a target signal-to-interference that matches the first data rate; and
performing a comparison between a signal-to-interference measured from the dedicated channel transmitted at the second data rate and the target signal-to-interference, wherein a transmit power control command is provided to a transmitter according to the comparison.

2. The method of claim 1, further comprising:
predicting the second data rate from received signaling information.

3. The method of claim 1, further comprising:
adjusting the target signal-to-interference to provide a required quality of the dedicated channel.

4. The method of claim 1, further comprising:
indicating if the target signal-to-interference ratio falls outside a range of allowed signal-to-interference values; and
setting the target signal-to-interference to a value which falls within the range of the allowed signal-to-interference ratio values.

5. The method of claim 1, further comprising:
adjusting the target signal-to-interference ratio by using:
a target signal-to-interference ratio adjusted to match the first data rate applied in a transmission of the first transmission time interval transmitted prior to the second transmission time interval;
an error indicator value characterizing the reliability of decoding a coding block transmitted prior to the second transmission time interval;
a target $$\left(\frac{E_b}{N_o}\right)$$

value corresponding to a required quality of the dedicated channel transmitted at the first data rate; and
a target $$\left(\frac{E_b}{N_o}\right)$$

value corresponding to the required quality of the dedicated channel transmitted at the second data rate.

6. The method of claim 1, further comprising:
adjusting the target signal-to-interference ratio by using an error indicator value characterizing the reliability of decoding a coding block transmitted prior to the second transmission time interval.

7. A system, comprising:
an adjusting unit operatively connected to a receiver and configured to:
estimate a change in a required signal-to-interference ratio with respect to a change from a first data rate to a second data rate, wherein the first data rate is applied to a dedicated channel during a first transmission time interval transmitted prior to a second transmission time interval;
adjust a target signal-to-interference ratio to match the second data rate applied during the second transmission time interval of the dedicated channel, wherein the target signal-to-interference ratio is configured to provide a reference signal-to-interference ratio value for closed-loop power control; and
adjust the target signal-to-interference ratio by using the change in the required signal-to-interference ratio and a target signal-to-interference ratio that matches the first data rate; and
a comparator configured to perform a comparison between a signal-to-interference ratio measured from the dedicated channel transmitted at the second data rate and the target signal-to-interference ratio,
wherein a transmitter is configured to receive a transmit power control command according to the comparison.

8. The system of claim 7, further comprising:
a predicting unit, operatively connected to the adjusting unit, configured to predict the second data rate from received signaling information.

9. The system of claim 7, wherein the adjusting unit is further configured to adjust the target signal-to-interference ratio to provide a required quality of the dedicated channel.

10. The system of claim 7, wherein the adjusting unit is further configured to indicate if the target signal-to-interference ratio falls outside a range of allowed signal-to-interference ratio values; and
wherein the adjusting unit is configured to set the target signal-to-interference ratio into a value which falls within the range of the allowed signal-to-interference ratio values.

11. The system of claim 7, wherein the adjusting unit is further configured to adjust the target signal-to-interference ratio by using:
a target signal-to-interference ratio adjusted to match the first data rate applied in transmission of the first transmission time interval transmitted prior to the second transmission time interval;
an error indicator value characterizing the reliability of decoding of a coding block transmitted prior to the second transmission time interval;
a target $$\left(\frac{E_b}{No}\right)$$

value corresponding to a required quality of the dedicated channel transmitted at the first data rate;
a target $$\left(\frac{E_b}{No}\right)$$

value corresponding to the required quality of the dedicated channel transmitted at the second data rate.

12. The system of claim 7, wherein the adjusting unit is further configured to adjust the target signal-to-interference ratio by using an error indicator value characterizing the reliability of decoding of a coding block transmitted prior to the second transmission time interval.

13. The system of claim 7, wherein the receiver is located in a mobile station and the transmitter is located in a base station.

14. The system of claim 7, wherein the receiver is located in a base station and the transmitter is located in a mobile station.

15. An apparatus, comprising:
an adjusting unit operatively connected to a receiver and configured to:
estimate a change in a required signal-to-interference ratio with respect to a change from a first data rate to a second data rate, wherein the first data rate is applied to a dedicated channel during a first transmission time interval transmitted prior to a second transmission time interval;
adjust a target signal-to-interference ratio to match the second data rate applied during the second transmission time interval of the dedicated channel, wherein the target signal-to-interference ratio is configured to provide a reference signal-to-interference ratio value for closed-loop power control; and
adjust the target signal-to-interference ratio by using the change in the required signal-to-interference ratio and a target signal-to-interference ratio that matches the first data rate; and
a comparator configured to generate a comparison between a signal-to-interference ratio measured from the dedicated channel transmitted at the second data rate and the target signal to interference ratio,
wherein a transmitter is configured to receive a transmit power control command according to the comparison.

16. The apparatus of claim 15, further comprising:
a predicting unit, operatively connected to the adjusting unit, configured to predict the second data rate from received signaling information.

17. The apparatus of claim 15, wherein the adjusting unit is further configured to adjust the target signal-to-interference ratio to provide a required quality of the dedicated channel.

18. The apparatus of claim 15, wherein the adjusting unit is further configured to indicate if the target signal-to-interference ratio falls outside a range of allowed signal-to-interference ratio values; and
wherein the adjusting unit is configured to set the target signal-to-interference ratio into a value which falls within the range of the allowed signal-to-interference ratio values.

19. The apparatus of claim 15, wherein the adjusting unit is further configured to adjust the target signal-to-interference ratio by using:
a target signal-to-interference ratio adjusted to match the first data rate applied in transmission of the first transmission time interval transmitted prior to the second transmission time interval;
an error indicator value characterizing the reliability of decoding of a coding block transmitted prior to the second transmission time interval;
a target $$\left(\frac{E_b}{No}\right)$$

value corresponding to a required quality of the dedicated channel transmitted at the first data rate;
a target $$\left(\frac{E_b}{No}\right)$$

value corresponding to the required quality of the dedicated channel transmitted at the second data rate.

20. The apparatus of claim 15, wherein the adjusting unit is further configured to adjust the target signal-to-interference by using an error indicator value characterizing the reliability of decoding of a coding block transmitted prior to the second transmission time interval.

21. An apparatus, comprising:
adjusting means, operatively connected to a receiver for:
estimating a change in a required signal-to-interference ratio with respect to a change from a first data rate to a second data rate, wherein the first data rate is applied to a dedicated channel during a first transmission time interval transmitted prior to a second transmission time interval;
adjusting a target signal-to-interference ratio to match the second data rate applied during a second transmission time interval of the dedicated channel, wherein the target signal-to-interference ratio is configured to provide a reference signal-to-interference ratio value for closed-loop power control; and adjusting the target signal-to-interference ratio by using the change in the required signal-to-interference ratio and a target signal-to-interference ratio that matches the first data rate; and comparing means for generating a comparison between a signal-to-interference ratio measured from the dedicated channel transmitted at the first data rate and the target signal-to-interference ratio, wherein a transmitter is configured to receive a transmit power control command according to the comparison.

22. A computer program product embodied on a computer readable medium, the computer program product being configured to control a processor to perform the method comprising:

estimating a change in a required signal-to-interference with respect to a change from a first data rate to a second data rate, wherein the first data rate is applied to a dedicated channel during a first transmission time interval transmitted prior to a second transmission time interval;

adjusting a target signal-to-interference to match the second data rate applied during the second transmission time interval of the dedicated channel, wherein the target signal-to-interference is configured to provide a reference signal-to-interference value for closed-loop power control;

adjusting the target signal-to-interference by using the change in the required signal-to-interference and a target signal-to-interference that matches the first data rate; and performing a comparison between a signal-to-interference measured from the dedicated channel transmitted at the second data rate and the target signal-to-interference, wherein a transmit power control command is provided to a transmitter according to the comparison.

* * * * *